US006566652B1

(12) United States Patent
Kato

(10) Patent No.: US 6,566,652 B1
(45) Date of Patent: May 20, 2003

(54) MASS SPECTROMETRY APPARATUS HAVING ION SOURCE NOT AT NEGATIVE PRESSURE WHEN FINISHING MEASUREMENT

(75) Inventor: Yoshiaki Kato, Mito (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 09/660,166

(22) Filed: Sep. 12, 2000

(30) Foreign Application Priority Data

Sep. 13, 1999 (JP) .......................................... 11-258470

(51) Int. Cl.[7] .......................... B01D 59/44; H01J 49/00; H01J 49/10

(52) U.S. Cl. ........................ 250/288; 250/281; 250/282

(58) Field of Search ................................ 250/307, 281, 250/282, 283, 288, 289; 73/1.01, 1.02, 1.05, 1.57, 1.58, 61.52, 54, 174, 227, 279, 335, 501, 514.01, 527, 649, 741, 861.42

(56) References Cited

U.S. PATENT DOCUMENTS

| | | | | |
|---|---|---|---|---|
| 4,209,696 A | | 6/1980 | Fite | |
| 4,219,696 A | | 8/1980 | Kogure et al. | |
| 4,501,817 A | * | 2/1985 | Andresen et al. | 436/161 |
| 4,629,478 A | * | 12/1986 | Browner et al. | 250/288 |
| 4,687,929 A | * | 8/1987 | Browner et al. | 250/282 |
| 4,762,995 A | * | 8/1988 | Browner et al. | 250/282 |
| 4,840,074 A | * | 6/1989 | Jessop | 73/864.81 |
| 4,883,958 A | * | 11/1989 | Vestal | 250/281 |
| 4,924,097 A | * | 5/1990 | Browner et al. | 250/343 |
| 4,944,180 A | * | 7/1990 | Tou et al. | 73/38 |
| 4,958,529 A | * | 9/1990 | Vestal | 73/864.81 |
| 5,012,052 A | * | 4/1991 | Hayes | 250/288 |
| 5,142,143 A | * | 8/1992 | Fite et al. | 250/288 |
| 5,175,433 A | * | 12/1992 | Browner et al. | 250/343 |
| 5,298,743 A | * | 3/1994 | Kato | 250/288 |
| 5,345,079 A | * | 9/1994 | French et al. | 250/288 |
| 5,349,186 A | * | 9/1994 | Ikonomou et al. | 250/288 |
| 5,744,798 A | * | 4/1998 | Kato | 250/288 |
| 6,002,130 A | * | 12/1999 | Kato | 250/289 |
| 6,087,657 A | * | 7/2000 | Kato | 250/288 |
| 6,177,669 B1 | * | 1/2001 | Wells et al. | 250/288 |
| 6,207,954 B1 | * | 3/2001 | Adrein, Jr. et al. | 250/288 |
| 6,207,955 B1 | * | 3/2001 | Wells et al. | 250/288 |
| 6,274,867 B1 | * | 8/2001 | Wells et al. | 250/288 |

FOREIGN PATENT DOCUMENTS

| | | | | |
|---|---|---|---|---|
| JP | 63317674 A | * | 12/1988 | H01L/21/203 |
| JP | 1-247471 | | 10/1989 | |
| JP | 05060068 A | * | 3/1993 | H01L/21/203 |
| JP | 6-76789 | | 3/1994 | |
| JP | 2854761 | | 3/1994 | |

* cited by examiner

*Primary Examiner*—Bruce Anderson
*Assistant Examiner*—Bernard Souw
(74) *Attorney, Agent, or Firm*—Kenyon & Kenyon

(57) ABSTRACT

In order to provide an atmospheric pressure ionization mass spectrometry apparatus in which the internal chamber of an ion source is not contaminated by ambient air, by automatically providing gas such as nitrogen to the ion source, with a simple means and without demanding a special operation by an operator when the measurement is finished, a sample solution from a liquid chromatograph is nebulized as fine droplets, each having a charge, from a nebulizer probe, and sample ions included therein are expelled into an atmosphere in the atmospheric pressure ion source and transferred to a mass spectrometer in a high vacuum part through a aperture, an intermediate pressure chamber and aperture. The ions are mass-analyzed, are detected by a detector, and mass spectra are provided and processed by a data processing device. When the measurement is finished, the stop valve is closed by a controller and a data processor 19, and the gas is supplied from the gas cylinder 40 to the nebulizer probe 4 through a by-pass pipe arrangement 41. Thereby, the atmospheric pressure ion source 7 is prevented from reaching a negative pressure.

10 Claims, 3 Drawing Sheets

(PRIOR ART)

MASS SPECTROMETRY APPARATUS HAVING ION SOURCE NOT AT NEGATIVE PRESSURE WHEN FINISHING MEASUREMENT

BACKGROUND OF THE PRESENT INVENTION

The present invention relates to a mass spectrometry apparatus in which a sample is ionized at atmospheric pressure, and particularly relates to a mass spectrometry apparatus that is most suitable in regard to protection from an accident and contamination after stopping measurement.

In order to analyze an extremely small amount of a useful or harmful organic compound at high-sensitivity, within heavy organic matrices in an environment, a food or a bio-fluid, a mass spectrometry apparatus directly connected to a liquid chromatograph (LC/MS apparatus) has been widely used. This apparatus is constructed with the liquid chromatograph (LC) acting as a separation means and a mass spectrometer (MS) providing a highly sensitive qualitative analysis and quantitative analysis means connected thereto, and has come to be used in various fields such as pharmaceutical science, medical science, chemistry, and environmental chemistry, etc.

FIG. 3 shows a conventional atmospheric pressure ionization LC/MS apparatus. A sample liquid is injected from a sample injection port 62 of the LC 1, and is fed into an analytical column 63 with a mobile phase solution sent from a mobile phase bottle 60 by a pump 61. The sample is separated into all components thereof by the analytical column 63. A water, methanol, or organic solvent such as acetonitrile etc or a mixture solution thereof are used as the mobile phase.

The sample component being separated is transmitted from the analytical column 63 with the solution of the mobile phase, and is introduced into the nebulizer probe 4 through a capillary tube.

A high voltage of from about 3 kV to 6 kV is applied on the tip part of the nebulizer probe 4. At this location, the nebulization gas is supplied from the gas cylinder 40 through the stop valve 42, and the solution is sprayed as minute droplets, each having a charge, into the atmosphere of the atmospheric pressure ion source 7 by a high-speed nebulization auxiliary gas emitted in a coaxial direction of the capillary tube and a high electric field. These fine droplets are further cleaved into tininess by frequent collisions with gas molecules in the atmosphere, and the ions are finally expelled into the atmosphere of the atmospheric pressure ion source 7. This ionization process is known as an electro spray ionization (ESI).

The ions are introduced into the vacuum chamber of an intermediate pressure chamber 12 through the aperture 11 or a capillary tube (not shown in the figure), and then introduced into a high vacuum chamber 16 from the aperture 14 through a differential pumping system evacuated by plural vacuum pumps 22 and 23. Using mass spectrometer 15, disposed in this high vacuum chamber 16, the ions are mass-analyzed, and a mass spectrum or a chromatogram is provided by a data processor 19.

In this atmospheric pressure ionization LC/MS apparatus, the ion source is extremely important, because neutral molecules of the sample must be released in a gas phase as the ions in a stable manner while maintaining a high efficiency. In the present invention, in accordance with the target sample for an analysis and the mobile phase of the LC, different plural atmospheric pressure ion sources may be used. That is, other than above-mentioned ESI used as the atmospheric pressure ion source, atmospheric pressure chemical ionization (APCI) for ionizing by a corona discharge from a needle electrode to which is applied a high voltage, and sonic spray ionization (SSI) which ionizes sample molecules in coincidence with the spray of the solution with the help of the spray gas of subsonic velocity, are well known.

A toxic organic solvent such as methanol or acetonitrile is used as the mobile phase of the liquid chromatograph (LC). As for this mobile phase, it is nebulized and vaporized within the atmospheric pressure ion source, and generates a large quantity of poisonous gas. In order to let the nebulized droplets evaporate, an internal chamber of the atmospheric pressure ion source 7 is kept at a high temperature (not less than 300). In addition, a high voltage (about 3 kV to 6 kV) is applied to the electrode for the ionization. Accordingly, the atmospheric pressure ion source 7 is isolated from an operator with a cover case 8 shaped like a tube or a box in order to prevent leakage of the poisonous gas externally and to prevent the operator from coming in contact with parts that are at a high voltage or at a high temperature.

Furthermore, U.S. Pat. No. 4,209,696 discloses promoting the evaporation of the nebulized droplets, by forming the atmospheric pressure ion source into an air tight structure so as to raise the pressure in the ion source, and to prevent invasion of an impurity from the outside atmosphere into the ion source so as not to generate unnecessary ions.

In Japanese patent 2854761 furthermore, surrounding the atmospheric pressure ion source with a double cover is shown, and stabalizing flow of the nebulization gas so as to stabilize the ionization thereof.

By forming the atmospheric pressure ion source 7 with an air tight structure, it becomes possible for the operator to continue the measurement safely. However, certain serious problems of accident and contamination can be caused by this air tight structure.

The sample solution which is nebulized into the atmosphere of the atmospheric pressure ion source 7 from the tip of the nebulizer probe 4 so as to be a gas, has a part thereof introduced into an intermediate pressure chamber 12 or into a high vacuum chamber 16 with the ions, and is evacuated by the vacuum pumps 22 and 23. The largest part of the nebulization gas and the sample solution which is vaporized goes outside and is disposed of through a disposal gas pipe 31 provided on a wall of the cover case 8 of the atmospheric pressure ion source 7. As the disposal gas contains harmful organic solvent in large quantities, it cannot be drained into laboratory directly. The disposal gas vapor is condensed in a waste liquid bottle 33 cooled by a freezer. The non-toxic nitrogen gas which is not condensed is disposed of from a disposal port 34 of the waste liquid bottle 33. As a simple method which does not use the freezer, instead uses a method of filling the water 32 in the effluent bottle 33, to bubble the disposal gas in the water in the waste bottle 33, and to absorb and dissolve freely methanol and acetonitrile in the exhaust gas into the water so as to remove them.

In the condition where the LC/MS apparatus is working, a large quantity of the nebulization gas is introduced in the atmospheric pressure ion source 7, and it is disposed of through a disposal gas pipe 31. When the measurement is finished, first of all, the operator stops the pump 61 of the LC 1, and stops sending the liquid of the mobile phase. The power supply of the heater of the atmospheric pressure ion source (not shown in the figure) is then turned on, the temperature is cooled down, and the power supply which is supplied to the high voltage ion source (not shown in the figure) is intercepted. The data processor 19 is stopped, the stop valve 42 is closed, and the feeding of nebulization gas is stopped.

Even if the measurement is finished, the evacuation system of the mass spectrometer does not stop. That is, the vacuum pumps 22 and 23 continue the evacuation. This is because there is a need to always keep the mass spectrometry apparatus in a high vacuum for the stable measurement of the LC/MS. The waste solution 32 is not disposed of to the outside when the measurement is stopped, and is put in the waste liquid bottle 33, and the end of the disposal pipe 31 inserted in the waste liquid bottle 33 sinks in the waste liquid 32. In such a state, if the vacuum system of LC/MS continues working during the night and the holidays, a possibility of a big accident exists.

That is to say, the atmospheric pressure ion source 7 becomes an air tight structure by means of a cover case 8. Therefore the atmosphere in the atmospheric pressure ion source 7 passes through apertures 11 and 14 and it is evacuated with vacuum pumps 22 and 23. The inside of the atmospheric pressure ion source 7 reaches a reduced pressure by being evacuated gradually for a long time.

By this pressure reduction, the waste liquid 32 in the waste liquid bottle 33 rises in the disposal pipe 31 so as to move it into the atmospheric pressure ion source 7. The solution containing water and the volatile solvent, and the salt or the measuring sample is vaporized at reduced pressure in the atmospheric pressure ion source 7, and the vapor passes through the apertures 11 and 14 into the high vacuum chamber 16 having the intermediate pressure chamber 12, the mass spectrometer 17 and the detector 18. Thereby, the LC/MS apparatus receives a fatal contamination. All the parts which contain the ion source 7, the intermediate pressure chamber 12, the high vacuum chamber 16, the mass spectrometer 15 and the vacuum pumps 22 and 23 are contaminated. In order to repair and to recover them, a thorough cleaning of the whole apparatus and replacement of the main part are necessary. For the user, it results in a great expenditure in addition to the apparatus being stopped for a long time.

Even if the waste liquid does not come into the atmospheric pressure ion source 7, the possibility of the volatile organic solvent and the water vapor reaching the atmospheric pressure ion source 7, the intermediate pressure chamber 12 or the high vacuum chamber 16, is high. That is to say, the apparatus is gradually contaminated daily, every time the measurement is stopped, and a high-sensitivity of the apparatus becomes impossible to maintain and the measurement becomes unstable.

In order to prevent the contamination of the apparatus and to continue the measurement in stable fashion, it is necessary not to require the operator to process the waste liquid perfectly, but to prepare a means to prevent this kind of accident on the LC/MS apparatus beforehand.

SUMMARY OF THE INVENTION

It is necessary for the internal chamber of the atmospheric pressure ion source 7 not to be at a negative pressure in order to prevent the contamination of the apparatus. A cover case 8 is mounted through an O-ring to be sealed generally on a partition flange in which the aperture 11 is provided. In this place, adhesion between the cover case 8 and the partition flange in which the aperture 11 is installed may be made bad intentionally, that is, the O-ring between them can be detached. In addition, a hole opened to the ambient air on a wall of the cover case 8 may be provided. However, the toxic organic solvent leaks out in to the laboratory, and there is a danger that the operator will be exposed to the toxic gas. Naturally, it is not desirable from the environmental standpoint to directly dispose of the exhaust gas in the ambient air through pipes.

Nebulization gas is introduced into the atmospheric pressure ion source 7 during measurement. By continuing not to stop this gas and to carry it away, the internal chamber of the atmospheric pressure ion source 7 can be assured not to be decompressed. However, the consumption of the gas is enormous, and three or four of the nitrogen gas cylinders (6 m3) per one day are consumed, and the security in feeding the gas becomes difficult.

In order to prevent mass consumption of the gas when not measuring, when the operator measures a gas supply pressure, the set value may be changed when not measuring. This case is not only troublesome, but there always exists a danger of forgetting the setting when the measurement is finished. If this is automated, the setting problem and any mistake can be prevented. A flow control device to control the flow rate from an outside computer can be inserted in a gas passage. That is to say, the quantity of the gas flow which is most suitable is maintained during the measurement, and when finishing the measurement, the quantity of the gas flow is reduced largely by the computer. It is a weak point that this system requires an expensive gas flow controller.

By arranging a pipe communicating to the ambient air on the cover case 8, and by arranging a stop valve etc. in this communicating pipe, this problem can be solved. If the stop valve on this communicating pipe is closed in the measurement, the solvent which is harmful is not drained in the laboratory. If the stop valve on the on this communicating pipe is opened when stopping the measurement, ambient air is freely introduced into the atmospheric pressure ion source through a run pipe, and the inside of the ion source does not reach a negative pressure. However, this system increased cost in requiring a new bulb, a pipe, a controlled source, and control software development. In addition, the air the laboratory is taken into the ion source 7 during times of non-measurement, and there is a danger of the contamination in the ion source.

An object of the present invention is in providing an mass spectrometry apparatus in which the gas such as nitrogen gas is supplied in the ion source automatically without demanding any special operation by the operator when terminating the measurement with a simple means, and in which contamination of the internal chamber of the ion source by ambient air which flows in when the internal chamber of the ion source reaches a negative pressure can be avoided. An atmospheric pressure ionization mass spectrometry apparatus for mass-analyzing ions by introducing the ions through an aperture into a mass spectrometer which is evacuated by a vacuum pump in the present invention has a nebulizer probe and a cover case which is airtight to the ambient air, an atmospheric pressure ion source for nebulizing a sample solution through the nebulizer probe so as to generate the ions, and an nebulization gas feeding means for supplying the nebulization gas to promote nebulization of the sample solution into the nebulizer probe. The atmospheric pressure ionization mass spectrometry apparatus is characterized in that the nebulization gas supply means has a stop valve for stopping the feed of the nebulization gas to the nebulizer probe and a by-pass passage for supplying the nebulization gas to the nebulizer probe by by-passing the stop valve. The stop valve is automatically closed according to a measurement ending signal. Other objects and special features of the present invention beyond the above will become clear from following explanation.

DETAILED DESCRIPTION OF THE PRESENT INVENTION

Figure 1:
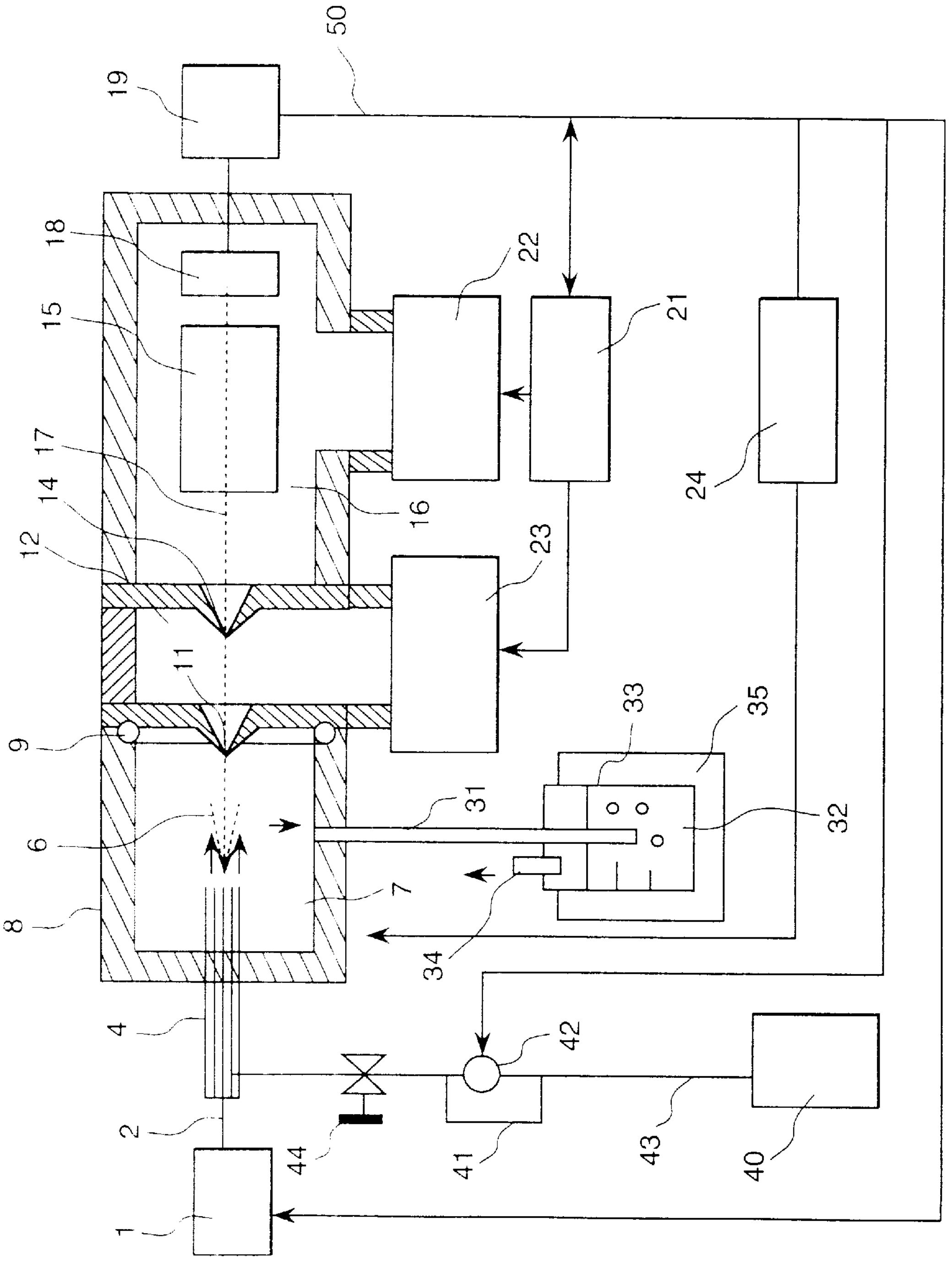
FIG. 1 is a block diagram of one embodiment of the atmospheric pressure mass spectrometry apparatus of the present invention.

FIG. 1 shows an apparatus in which a sample solution which includes, for example, water or an organic solvent is sent from a liquid chromatograph (LC) 1 into the nebulizer probe 4 through a capillary tube 2.

The cover case 8 of the ion source 7 is mounted on a partition flange, having an aperture 11 for sampling the ions, through an O-ring, in order to keep the chamber of the source airtight with respect to the ambient air. The nebulizer probe 4 is provided on the wall of the cover case 8, and has plural coaxial capillary tubes of different diameters. The elute from the LC 1 is introduced into the first (most internal) capillary tube. Between the first capillary tube and the second capillary tube surrounding the first capillary tube, the nebulization gas (e.g. nitrogen gas etc.), which sprays the LC eluate is carried. Between the second capillary tube and the third capillary tube surrounding the second capillary tube, a heated evaporation gas is passed in order to dry the sprayed droplets. The nebulization gas is supplied from the gas cylinder 40 through the gas pipe arrangement 43 and its flow rate is adjusted by a needle valve 44.

In the atmospheric pressure ion source 7, a bath gas to regularize flow of the gas in the atmospheric pressure ion source 7, and to prevent contamination inside the cover case 8, and a counter gas which promotes evaporation of the nebulized droplets, are passed, according to necessity. For these gases, needle valves control the quantity of the gas flow independently and respective independent stop valves for switching the flows on/off are provided.

A direct current high voltage of about 3 to 6 kV supplied from a high voltage power supply (not shown in the figure) is applied to a tip edge of the nebulizer probe 4. The solution is nebulized from the tip of the probe 4 into the atmosphere of the atmospheric pressure ion source 7 as fine droplets 6 respectively having charges due to the high electric field generated in the tip neighborhood of the probe 4 by this high voltage and a nitrogen gas for nebulization. The fine droplets 6 having charges collide with the neblization gas molecules while flying in the atmosphere so that solvent at the surface of the droplet is vaporized. Therefore, the sample ions contained in the droplets finally are expelled into the atmosphere in the atmospheric pressure ion source 7. The ions which are generated, enter into the high vacuum part 16 evacuated by the vacuum pump 22 as an ion beam 17, from the aperture 11 for sampling the ions, through the intermediate pressure chamber 12 evacuated by the vacuum pump 23 and the aperture 14. The ions travel to the mass spectrometer 15, are mass-analyzed there, and are detected by the detector 18 so as to provide a mass spectrum or a mass chromatogram using the data processor 19.

The controller and the data processor 19 control the evacuation system power supply 21 for the vacuum pump 22 and 23, the atmospheric pressure ion source power supply 24, the liquid chromatograph 1, and the stop valve 42 of the spray gas etc. by way of a signal line 50.

The nebulization gas and the solvent gas which are vaporized, are drained from a disposal pipe 31 provided on the cover case 8 of the atmospheric pressure ion source 7 into a waste liquid bottle 33 cooled by a freezer 35. The solvent gas is condensed in the waste liquid bottle so as to provide a solution 32, and is saved in the disposal liquid bottle 33. The nitrogen gas which is not condensed in the waste liquid bottle, is exhausted from the exhaust gas port 34 of the waste liquid bottle into the atomosphere.

In the measurement using the LC/MS, the nebulization gas is sent from the gas cylinder 40, acting as the gas source, and the nitrogen gas generating device into the nebulizer probe 4 through the pipe arrangement 43. When the measurement is finished, the high voltage of the ion source 7 is turned off, and the heater etc. are no longer heated too. Afterwards, the mobile phase from the LC 1 is stopped being sent, and, finally, the stop valve 42 is closed to stop the inflow of the nebulization gas. These controls are automatically performed according to the measurement end signal from the controller and the data processor 19.

The gas pipe arrangement (a passage) 43 is connected to a by-pass pipe arrangement (a passage) 41 that is, for example, 1 m. long, and 1 mm inner diameter, from the inlet to the outlet of the stop valve 42 so as to by-pass the stop valve 42 and to supply the nebulization gas. In order to keep the inside of the atmospheric pressure ion source 7 from being at a pressure that is negative with respect to the atmospheric pressure when the stop valve 42 is closed, the flow quantity of the gas flowing through this by-pass pipe arrangement 41 should be not less than volume of the gas evacuated from the aperture 11, and concretely, the bore and the length of the by-pass pipe arrangement 41 are set to be the same or more than the aperture size. In the case where the diameter of the aperture is 0.3 mm, the flow quantity of the gas passing through this aperture is about several liters/minute at atmospheric pressure. When the stop valve 42 is opened up in in operation, an amount of nebulization gas of about 10 litter liters/minute at atmospheric pressure is carried away. The by-pass pipe arrangement 41 is not changed.

In the atmospheric pressure ion source 7, the desired quantity of the gas is supplied after the measurement has ended, and the inside need not go to a negative pressure. Therefore a back flow of solvent to the atmospheric pressure ion sounce 7 through the disposal pipe 31 is prevented. As a result, the contamination of the atmospheric pressure ion source 7 is prevented beforehand, even if the disposal of solvent is forgotten.

Figure 2:
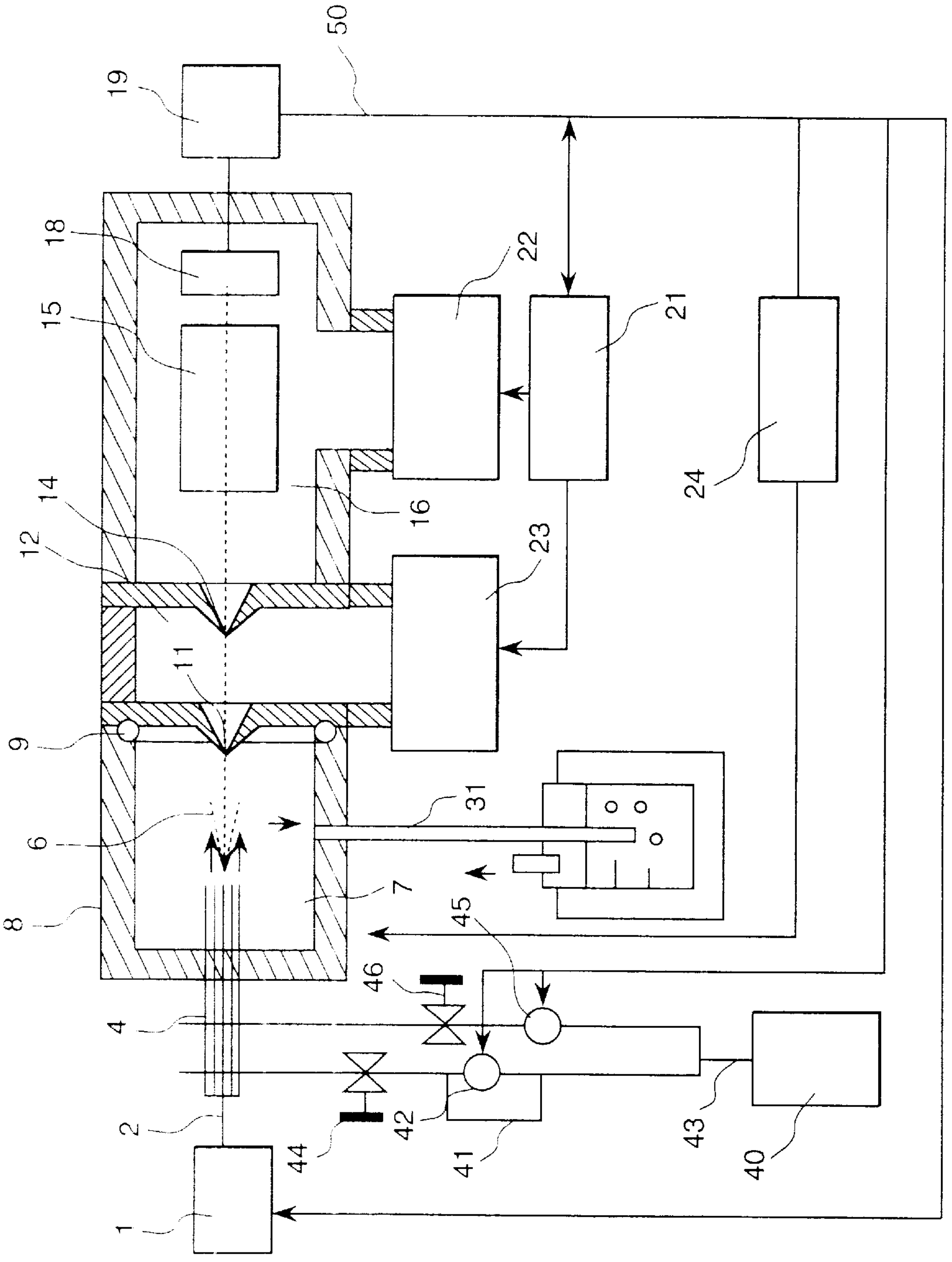
FIG. 2 is a block diagram of another embodiment of the atmospheric pressure mass spectrometry apparatus of the present invention.
Figure 3:
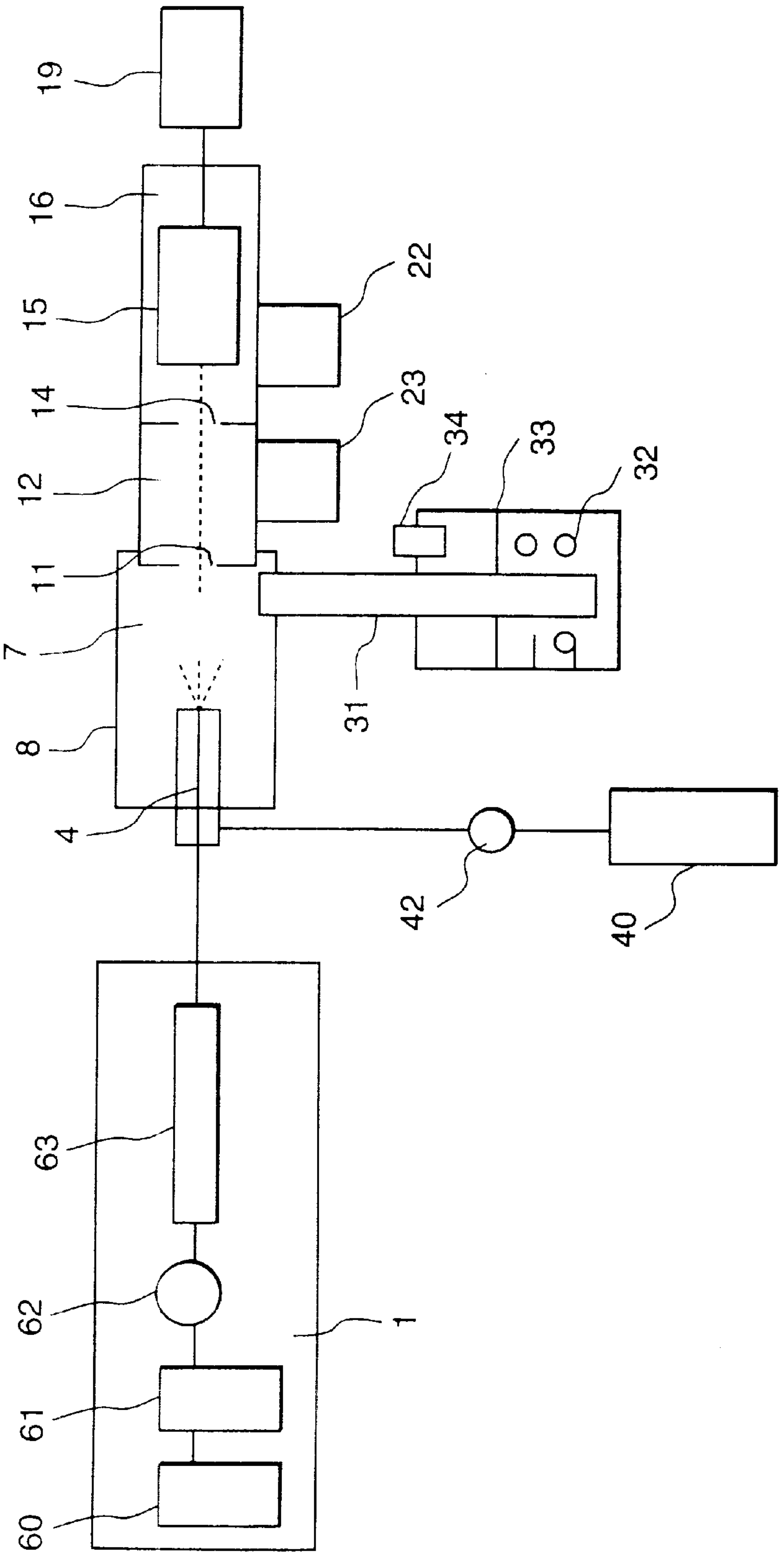
FIG. 3 is a block diagram of a conventional atmospheric pressure ionization LC/MS apparatus.

When a plural gas is supplied to the atmospheric pressure ion, source 7, it is not necessary to provide the by-pass pipe arrangement for all gas supply lines. That is to say as shown in FIG. 2, for example, when there is another gas supply system, including the gas pipe arrangement (a passage) 43, to the nebulizer probe 4 through the stop valve 45 and the needle valve 46, besides the gas supply system including the gas pipe arrangement (a passage) 43 connected to the gas cylinder 40 to the nebulizer probe 4 through the stop valve 42 and the needle valve 44, if at least one gas supply system, for example, gas pipe arrangement 43 is provided with a by-pass pipe arrangement (a passage), the atmospheric pressure ion source 7 can be prevented from reaching a negative pressure.

As stated above, when the operator sets the measurement ending point in the controller and the data processor 19, will the LC 1 and the atmospheric pressure ion source 7 will go to the stop state responding to the measurement end signal from the controller and the data processor 19 automatically, and furthermore, the status of the stop valve 42 becomes to be closed, thereby it is not necessary for him to be concerned about missing these steps. And even if the disposal of the waste liquid is forgotten, the contamination of the apparatus can be prevented beforehand.

Many kinds of the gases are supplied besides the nebulization gas in the atmospheric pressure ion source 7. When stopping the measurement, all gas is not intercepted, and the gases (Bath Gas) of low flow rate does not stop, although the nebulization gas and the evaporation gas of high flow rate may stop. Thereby, consumption of the gas is reduced as much as possible, and the ion source is prevented from going to a negative pressure. Plural stop valves are provided on the plural gas feeding lines, and the problem is solved by controlling on/off conditions from the data processor.

According to this invention, an atmospheric pressure ionization mass spectrometry apparatus is provided in which a gas such as nitrogen gas is supplied to the ion source automatically without demanding any special operation by the operator when stopping the measurement, with a simple means, and the internal chamber of the ion source is not contaminated by the ambient air.

What is claimed is:

1. A mass spectrometry apparatus for mass-analyzing ions by introducing said ions generated by an ion source through an aperture into a mass spectrometer which is evacuated by a vacuum pump, comprising:

a nebulizer probe through which a sample solution is fed to generate ions, a cover case kept airtight to the ambient air, a nebulization gas feeding means for supplying a nebulization gas to said nebulizer to promote nebulization of said sample solution in said nebulizer probe, a stop valve in said nebulization gas feeding means for stopping feeding of said nebulization gas from a nebulization gas cylinder to said nebulizer probe, and a by-pass passage for supplying said nebulization gas to said nebulizer probe by by-passing said stop valve.

2. A mass spectrometry apparatus as defined in claim 1, wherein a size of said by-pass passage is selected so that a flow rate of said nebulization gas flowing through said by-pass passage becomes more than a flow rate of a gas which is evacuated through said aperture.

3. A mass spectrometry apparatus for mass-analyzing ions by introducing said ions generated by an ion source through an aperture into a mass spectrometer which is evacuated by a vacuum pump, comprising:

a nebulizer probe though which a sample solution is fed to generate ions, a cover case kept airtight to the ambient air, means for supplying said nebulization gas to promote nebulization of said sample solution in said nebulizer probe, means for disposing of gas in said ion source, a mass spectrometer evacuated to be at a vacuum for mass-analyzing said ions by introducing said ions therein through an aperture, means for detecting said ions mass-analyzed by said mass spectrometer, means for generating a measurement ending signal a stop valve for stopping feeding of said nebulization gas to said nebulizer probe, a by-pass passage for supplying said nebulization gas to said nebulizer probe by by-passing said stop valve, and a control to automatically close said stop valve in response to said measurement ending signal for said mass spectrometry apparatus.

4. A mass spectrometry apparatus as defined in claim 3, wherein a size of said by-pass passage is selected so that flow rate of said nebulization gas flowing through said by-pass passage is not less than that of a gas evacuated through said aperture.

5. A mass spectrometry apparatus as defined in claim 4, wherein said nebulization gas supply means is provided with plural gas supply systems each having said stop valve, and said by-pass passage is provided in at least one of said plural gas supply systems.

6. The mass spectrometry apparatus as defined in claim 1, wherein said nebulization gas supply means is provided with plural gas supply systems each having said stop valve, and said by-pass passage is provided in at least one of said plural gas supply systems.

7. The mass spectrometry apparatus as defined in claim 3, wherein said nebulization gas supply means is provided with plural gas supply systems each having said stop valve, and said by-pass passage is provided in at least one of said plural gas supply systems.

8. A mass spectrometry apparatus as defined in claim 1, said mass spectrometry apparatus further comprising a waste liquid bottle for saving waste liquid from said ion source, and a waste pipe for communicating said ion source to said waste liquid bottle.

9. A mass spectrometry apparatus as defined in claim 3, said mass spectrometry apparatus further comprising a waste liquid bottle for saving waste liquid from said ion source, and a waste pipe for communicating said ion source to said waste liquid bottle.

10. A mass spectrometry apparatus for mass-analyzing ions as defined in claim 1, comprising:

a control automatically closing said stop valve based on a measurement ending signal or said mass spectrometry apparatus.

* * * * *